(12) United States Patent
Ikeda (10) Patent No.: US 7,734,234 B2
(45) Date of Patent: Jun. 8, 2010

(54) POSITIONAL-DEVIATION CORRECTION APPARATUS, METHOD OF CONTROLLING POSITIONAL DEVIATION, AND IMAGE FORMING APPARATUS

(75) Inventor: Hiroaki Ikeda, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 217 days.

(21) Appl. No.: 11/812,584

(22) Filed: Jun. 20, 2007

(65) Prior Publication Data

US 2008/0273907 A1      Nov. 6, 2008

(30) Foreign Application Priority Data

Jul. 11, 2006    (JP)    ............................... 2006-190722

(51) Int. Cl.
*G03G 15/00* (2006.01)
(52) U.S. Cl. .................. 399/301; 399/299; 399/300; 347/116
(58) Field of Classification Search ................ 399/301, 399/300, 299; 347/116
See application file for complete search history.

(56) References Cited

U.S. PATENT DOCUMENTS

| | | | | |
|---|---|---|---|---|
| 2001/0004425 | A1* | 6/2001 | Shinohara et al. | ........... 399/301 |
| 2004/0033090 | A1 | 2/2004 | Yamanaka et al. | |
| 2004/0109708 | A1* | 6/2004 | Kobayashi et al. | .......... 399/301 |
| 2005/0031361 | A1* | 2/2005 | Kobayashi | ................... 399/301 |
| 2005/0041990 | A1* | 2/2005 | Sugiyama | .................... 399/301 |
| 2006/0088344 | A1* | 4/2006 | Aikawa | ....................... 399/301 |

FOREIGN PATENT DOCUMENTS

| | | |
|---|---|---|
| EP | 1345088 | 9/2003 |
| EP | 1369749 | 12/2003 |
| EP | 1 496 403 | 1/2005 |
| EP | 1 781 012 | 5/2007 |
| JP | 11-161129 | 6/1999 |
| JP | 2002-244387 | 8/2002 |

OTHER PUBLICATIONS

Office Action dated Oct. 24, 2007 for corresponding European Application No. 07111150.4.
European Office Action dated Sep. 28, 2009, issued in corresponding Application No. EP 07111150.

* cited by examiner

*Primary Examiner*—David M Gray
*Assistant Examiner*—G. M. Hyder
(74) *Attorney, Agent, or Firm*—Harness, Dickey & Pierce, P.L.C.

(57) ABSTRACT

A first correction pattern and a second correction pattern are formed on an endless conveyor belt. The first correction pattern is located ahead of the second correction pattern on the conveyor belt with respect to the direction of movement of the conveyor belt. A sensor detects positional information of the correction patterns. A timing changing unit (controlling unit) changes a detection timing of the second correction pattern from a time point at which the sensor detects the second correction pattern.

15 Claims, 11 Drawing Sheets

POSITIONAL-DEVIATION CORRECTION APPARATUS, METHOD OF CONTROLLING POSITIONAL DEVIATION, AND IMAGE FORMING APPARATUS

CROSS-REFERENCE TO RELATED APPLICATIONS

The present document incorporates by reference the entire contents of Japanese priority document, 2006-190722 filed in Japan on Jul. 11, 2006.

BACKGROUND OF THE INVENTION

1. Field of the Invention

The present invention relates to a positional-deviation correction apparatus, a method of controlling a positional deviation, and an image forming apparatus to obtain an image visualized by superimposing a plurality of colors by an electrophotographic printer and the like.

2. Description of the Related Art

In image forming apparatuses, it is common to perform correction of positional deviation by checking how a test pattern is printed on a recording medium. In the technology disclosed in Japanese Patent No. 3506891, a test pattern is printed on the left and right sides of a recording medium in a conveying direction and includes a first pattern and a second pattern opposing to each other. The first pattern includes stripes formed at a specific interval, and each strip has a specific line width. The second pattern also includes strips formed at a specific interval, and each strip has a specific line width; however, the specific interval is different from the interval of the first pattern.

In color image forming apparatuses, it is common to perform positional alignment of each of the colors. Japanese Patent Application Laid-Open No. 2002-244387 discloses a technology that has a mode for executing each of a plurality of processes, enables a user to select a desired mode and performs positional alignment of the colors appropriate to the user selected mode.

In the related art, a positional-deviation correction apparatus creates images of a plurality of sets of positional deviation correction patterns and detects positional information of each set, in an unambiguous time from start of exposure. However, due to a tolerance in layout size of the positional-deviation correction apparatus, such as a stretching of an intermediate transfer belt, there is an occasion that this unambiguous time cannot be inserted between the respective sets of the correction patterns. This leads to a problem that not all the positional information of the sets of the correction patterns can be read.

SUMMARY OF THE INVENTION

It is an object of the present invention to at least partially solve the problems in the conventional technology.

According to an aspect of the present invention, a positional-deviation correction apparatus includes a first-pattern forming unit that forms a plurality of sets of first correction patterns on an endless conveying unit; a second-pattern forming unit that forms a second correction pattern before the correction-pattern forming unit forms the correction patterns; and a detecting unit configured to detect positional information of each set of the first correction patterns and the second correction pattern; and a timing changing unit that changes a detection timing for detecting positional information of each set of the first correction patterns from a time point at which the detecting unit detects positional information of the second correction pattern.

According to another aspect of the present invention, a method of controlling positional-deviation includes forming a second correction pattern on an endless conveying unit; forming a plurality of sets of first correction patterns on the endless conveying unit after the second correction pattern; detecting positional information of each set of the first correction patterns and the second correction pattern; and changing a detection timing, at the detecting, for detecting positional information of each set of the first correction patterns from a time point at which positional information of the second correction pattern is detected at the detecting.

According to still another aspect of the present invention, an image forming apparatus includes a first-pattern forming unit that forms a plurality of sets of first correction patterns on an endless conveying unit; a second-pattern forming unit that forms a second correction pattern before the correction-pattern forming unit forms the correction patterns; a detecting unit configured to detect positional information of each set of the first correction patterns and the second correction pattern; and a timing changing unit that changes a detection timing for detecting positional information of each set of the first correction patterns from a time point at which the detecting unit detects positional information of the second correction pattern.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the invention will be described in detail with reference to the accompanying drawings.

Figure 1:
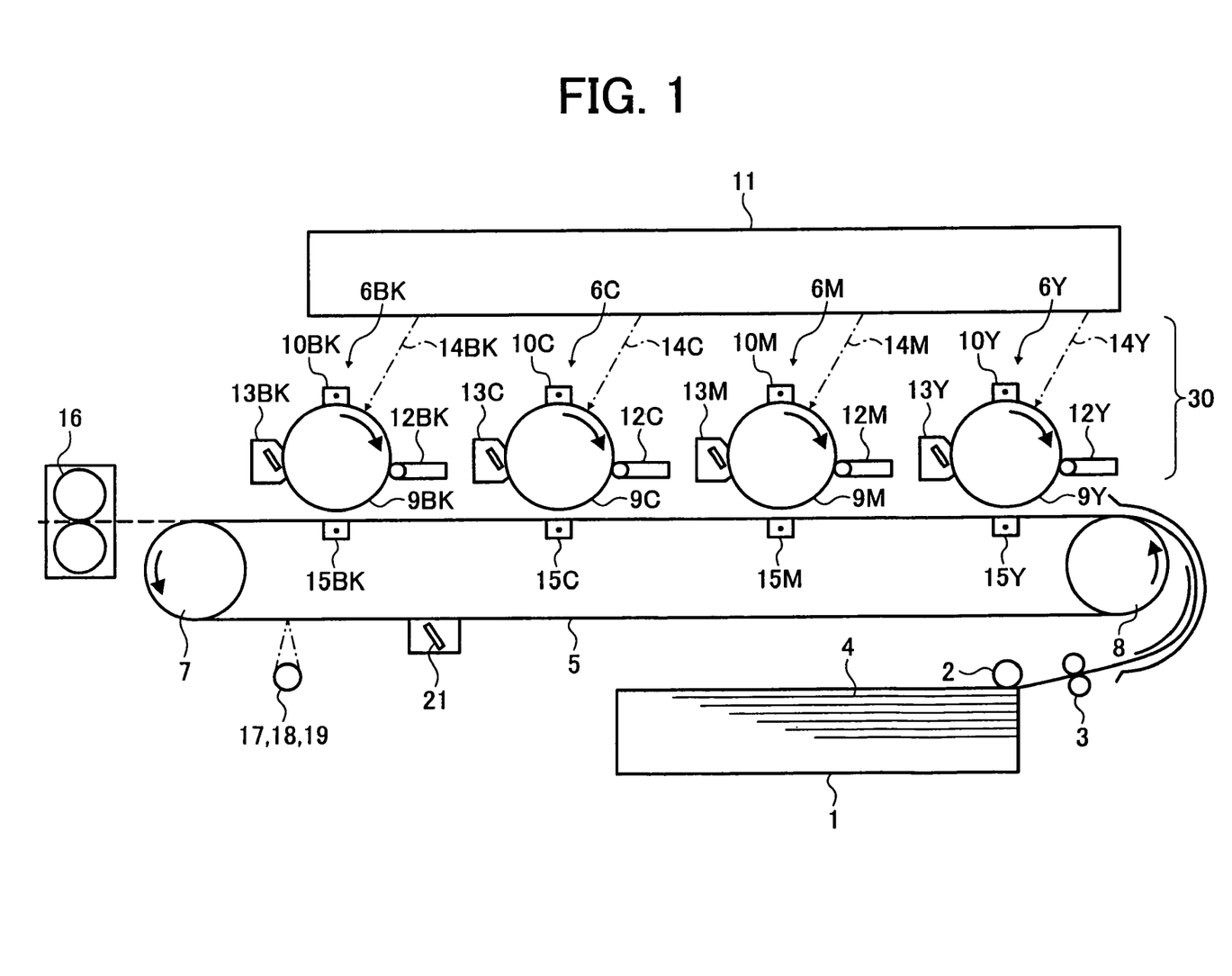
FIG. 1 is a schematic diagram of an image forming apparatus according to an embodiment of the present invention.

As shown in FIG. 1, in an image forming apparatus according to an embodiment of the present invention, image forming units of respective colors are arranged along a conveyor belt (endless transporting unit). This arrangement is a so-called tandem type arrangement. A plurality of image forming units (electrophotographic processing units) 6Y, 6M, 6C, and 6BK are arranged along the conveyor belt 5 sequentially from the upstream side in a conveying direction of the conveyor belt 5. The image forming units 6Y, 6M, 6C, and 6BK are collectively referred to as an image creating unit 30.

Paper (recording paper) are stacked in a paper feed tray 1. A paper feed roller 2 picks-up one paper 4 from the paper feed tray 1, and a pair of separation rollers 3 conveys the paper 4 to the conveyor belt 5. The conveyor belt 5 conveys the paper 4 to the image creating unit 30.

An internal configuration of each of the image forming units 6Y, 6M, 6C, and 6BK are the same, except that each of them corresponds to a different color. Specifically, the yellow image forming unit 6Y forms a yellow image, the magenta image forming unit 6M forms a magenta image, the cyan image forming unit 6C forms a cyan image, and the black image forming unit 6BK forms a black image.

The yellow image forming unit 6Y will be described in detail below. Because the other image forming units 6M, 6C, and 6BK have the same configuration as the yellow image forming unit 6Y, their description is omitted.

The conveyor belt 5 is an endless belt. The conveyor belt 5 is rolled on a driving roller 7 and a driven roller 8. A driving motor (not shown) rotates and drives the driving roller 7. The conveyor belt 5 rotates with the rotation of the driving roller 7. The driving motor, the driving roller 7, and the driven roller 8 function as a driving unit for the conveyor belt 5.

The paper 4 conveyed to the conveyor belt 5 sticks to the conveyor belt 5 because of an electrostatic adsorption force, and the paper 4 moves with the rotation of the conveyor belt 5. First, the paper 4 is conveyed to a position below the yellow image forming unit 6Y, and a yellow toner image on the yellow image forming unit 6Y is transferred onto the paper 4.

The yellow image forming unit 6Y includes a photosensitive drum 9Y that is a photosensitive body. A charger 10Y, a developing unit 12Y, a cleaning unit (not shown), and a de-charger 13Y are arranged around the photosensitive drum 9Y. An optical writing unit 11 emits laser lights 14Y, 14M, 14C, and 14BK, which are exposure light corresponding to colors of an image formed by the respective image forming units 6Y, 6M, 6C, and 6BK.

A surface of the photosensitive drum 9Y is exposed to the laser light 14Y corresponding to the yellow image, after uniformly charged by the charger 10Y in the dark, thereby forming an electrostatic latent image. The developing unit 12Y visualizes the electrostatic latent image with the yellow toner, thereby forming the yellow toner image on the photosensitive drum 9Y.

The toner image is transferred on the paper 4 by a transferring unit 15Y, at a position (transfer position) where the photosensitive drum 9Y comes in contact with the paper 4 on the conveyor belt 5. As a result, a yellow toner image is formed on the paper 4. After removing unnecessary residual toner left on the surface of the photosensitive drum 9Y with the cleaning unit, the photosensitive drum 9Y that has finished the transferring of the toner image is de-charged with the de-charger 13Y. Then, the photosensitive drum 9Y waits for the formation of the next image.

The conveyor belt 5 then conveys the paper 4 with the yellow toner image to a position below the magenta image forming unit 6M. A photosensitive drum 9M of the magenta image forming unit 6M carries a magenta toner. The magenta toner image is transferred on the paper 4 so that it superposes onto the yellow image already formed on the paper 4.

Then, the conveyor belt 5 conveys the paper 4 to the cyan image forming unit 6C and then to the black image forming unit 6BK. As a result, a cyan toner image, and a black toner image are superimposed and transferred on the paper 4. Accordingly, a full color image is formed on the paper 4. The paper 4 with the full color image is then separated from the conveyor belt 5 and conveyed to a fixing unit 16 where the full color image is fixed to the paper 4.

Sometimes a positional deviation occurs between the respective colors, because the toner images of the respective colors do not superimpose at a position where they should theoretically. Such a positional deviation can occur due displacement of the axes of the photosensitive drums 9Y, 9M, 9C, and 9BK, non-parallelism of the photosensitive drums 9Y, 9M, 9C, and 9BK, displacement of a deflecting mirror (not shown) that deflects laser light in the optical writing unit 11, a error in writing timing of the electrostatic latent image to the photosensitive drums 9Y, 9M, 9C, 9BK, and the like.

Other known causes of the positional deviation of the respective colors are, a skew, a positional deviation of a resist in a sub-scanning direction, a magnification error in a main scanning direction, the positional deviation of the resist in the main scanning direction, and the like.

The positional deviation leads to degraded image quality, so that the positional deviation needs be corrected. As shown in FIG. 1, sensors 17, 18, and 19 are arranged at the downstream side of the black image forming unit 6BK along the main scanning direction, which is a direction perpendicular to the direction of rotation of the conveyor belt 5. The sensors 17, 18, and 19 function as an image detecting unit.

Figure 2:
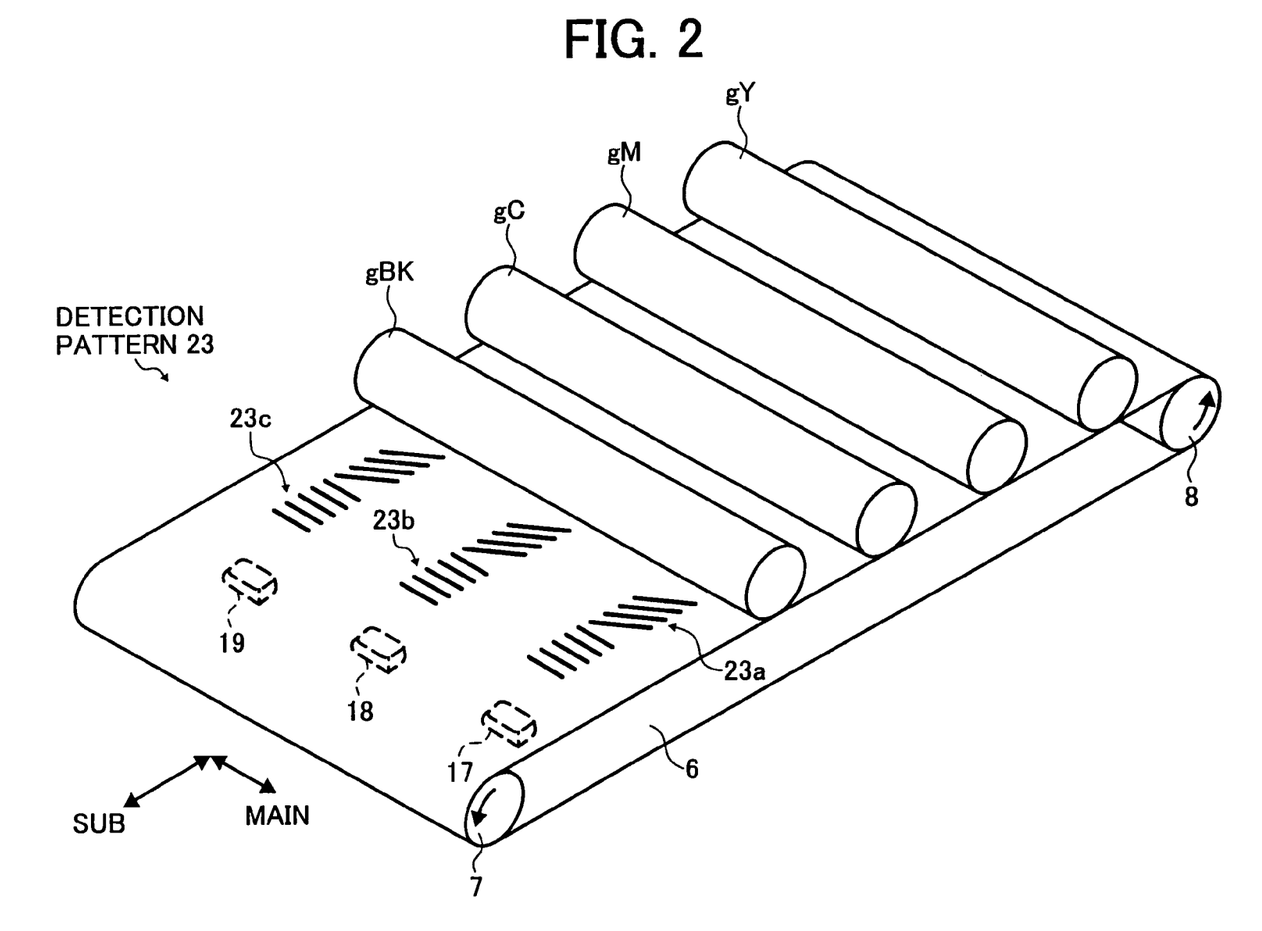
FIG. 2 is a perspective view for explaining an example of arrangements of an image creating unit, correction marks, and sensors shown in FIG. 1.
Figure 3:
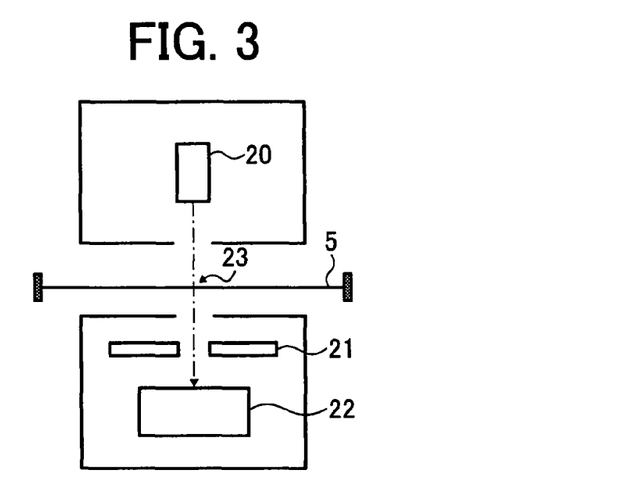
FIG. 3 is a schematic diagram for explaining a configuration of the sensor.

FIG. 2 is an enlarged perspective view of the image detecting unit and a periphery thereof. FIG. 3 is a schematic diagram of the image detecting unit. The image detecting unit includes a light emitting unit 20, a slit 21, and a light receiving unit 22. The image detecting unit detects positional deviation correction patterns 23 formed on the conveyor belt 5. One image detecting unit is arranged at each of the both edges and the center in the main scanning direction of the conveyor belt 5. A correction pattern 23 is formed on the conveyor belt 5. The correction pattern 23 includes correction marks 23a, 23b, and 23c each corresponding to each of the image detecting unit.

Figure 4:
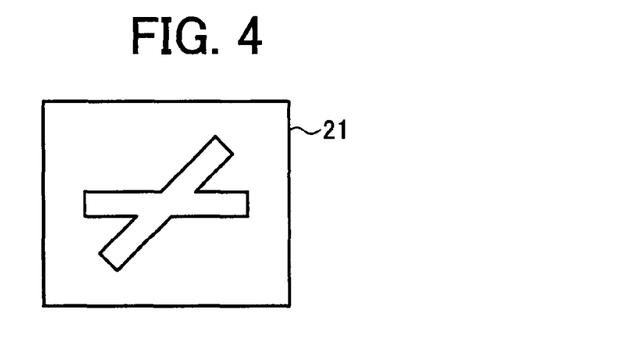
FIG. 4 is a schematic diagram for explaining a structure of a slit shown in FIG. 3.

FIG. 4 is an enlarged view of the slit 21. The slit 21 includes two openings: one for detecting a line parallel to the main scanning direction (hereinafter, "parallel line") and another one for detecting a line inclined to the parallel line (hereinafter, "oblique line").

Figure 5:
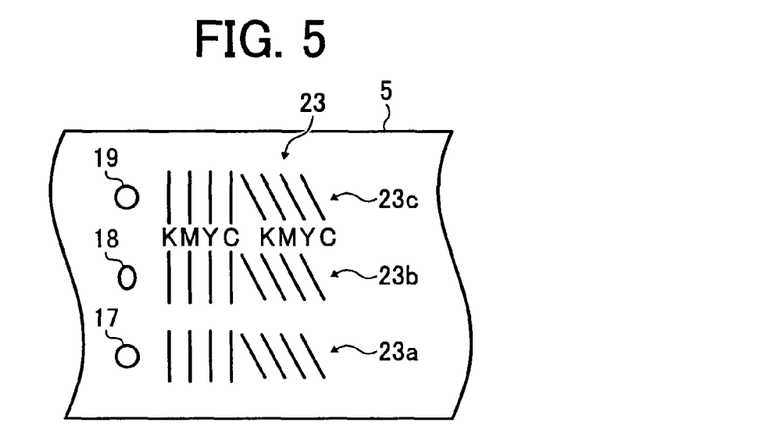
FIG. 5 is a schematic diagram for explaining an example of arrangements of the sensors and the correction patterns.

FIG. 5 is an enlarged view of the correction pattern 23. Each of the correction marks 23a, 23b, and 23c includes two sets of black (K), magenta (M), yellow (Y), and cyan (C) lines. One set of the lines includes parallel lines and the other set includes oblique lines. Each line is separated by a predetermined target length d from an adjoining line. By doing so, detection signals are produced in a typical wave form with peaks and valleys, when the line reaches the opening of the slit, thereby enabling to find the center of the line accurately.

Figure 6:
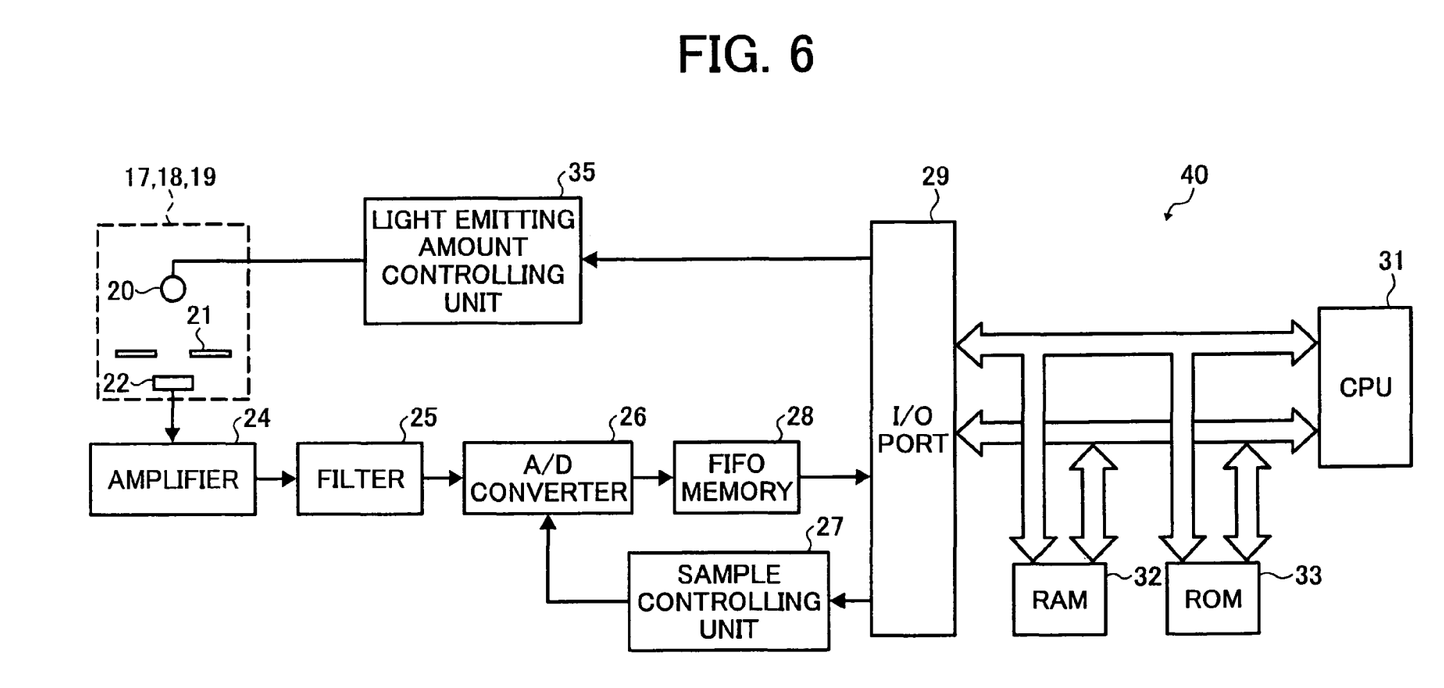
FIG. 6 is a block diagram of a controlling system.

FIG. 6 is a block diagram of a controlling system 40 that processes the data detected by the image detecting unit. The controlling system 40 includes a central processing unit (CPU) 31 that executes a predetermined arithmetic processing based on the detected data. Specifically, the CPU 31 calculates respective amounts of skew, positional deviation of the resist in the sub-scanning direction, magnification error in the main scanning direction, and positional deviation of the resist in the main scanning direction.

The skew can be corrected, for example, by adjusting the inclination of the deflecting mirror in the optical writing unit 11, or by adjusting the optical writing unit 11. The positional deviation of the resist in the sub-scanning direction can be corrected, for example, by controlling a write start timing of the line and a surface phase of a polygon mirror. The magnification error in the main scanning direction can be corrected, for example, by changing image writing frequency. The positional deviation of the resist in the main scanning direction can be corrected by correcting write start timing in the main scanning direction.

FIG. 5 is an example of a minimum set of patterns required to calculate different color registration deviation amounts of respective colors. However, there are alternative ways to offset fluctuations caused by rotation of the photosensitive body, an intermediate transfer belt, the conveyor belt and the like. For example, a plurality of sets of marks may be formed with respect to one cycle of the photosensitive body, and their correction patterns may be detected by the sensors 17, 18, and 19, thereby taking a mean value of the detection result. Thus, more accurate detection can be performed.

The process to process the detected data is to be explained with reference to FIG. 6. The signals obtained from the light receiving unit 22 are amplified by an amplifier (AMP) 24. Signal components only detected at the line are passed through by a filter 25, and converted into digital data from analog data, by an analog/digital (A/D) converter 26. Sampling of the data is controlled by a sample controlling unit 27, and the sampled data is stored in a first-in-first-out (FIFO) memory 28. When the detection of one set of correction marks is finished, the stored data is loaded in the CPU 31 and a random access memory (RAM) 32 by a data bus via an I/O port 29. The CPU 31 executes a predetermined arithmetic processing, and calculates the different deviation amounts.

In a read only memory (ROM) 33, not only the computer program to calculate the various deviation amounts, but also various computer programs to control the positional-deviation correction apparatus and the image forming apparatus according to the present embodiment of the present invention are stored. The CPU 31 monitors the detection signals from the light receiving unit 22 at an appropriate timing, and controls an amount of emitting light by a light emitting amount controlling unit 35. This enables to carry out a reliable detection even if the conveyor belt and the light emitting unit 20 may deteriorate, for example. The level of light-receiving signals from the light receiving unit 22 is always kept constant. Accordingly, the CPU 31 and the ROM 33 function as controlling units to control an entire operation of the image forming apparatus.

Figure 7:
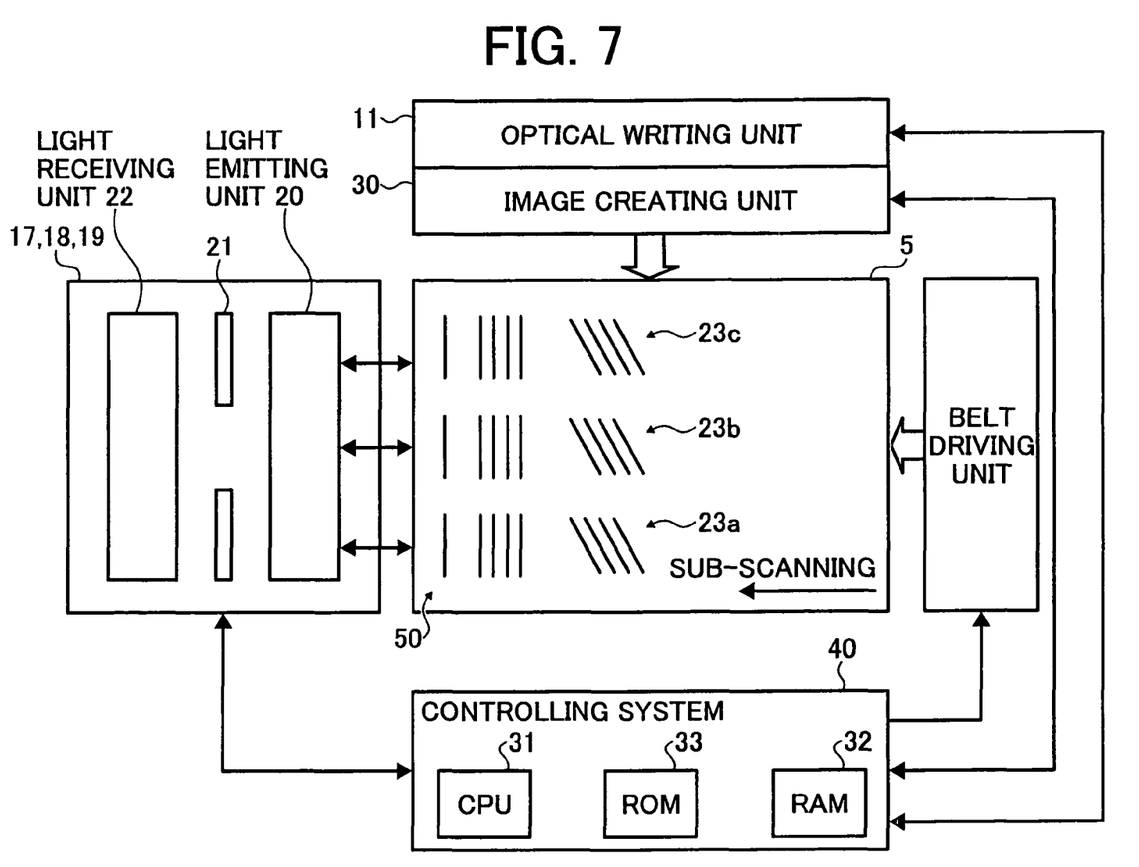
FIG. 7 is a functional block diagram of a positional-deviation correction apparatus.

FIG. 7 is a block diagram of a functional configuration of a positional deviation correction portion in the image forming apparatus according to the embodiment of the present invention. Here, respective configurations of FIGS. 1 to 6 are shown as one functional block. In FIG. 7, the reference numeral 40 denotes the controlling system having a microcomputer such as the CPU 31, the RAM 32, the ROM 33, and a timer (not shown). The reference numeral 50 denotes a second pattern hereinafter described. Their functions are to be described below with reference to the flowcharts of FIGS. 9 and 11.

Figure 8A:
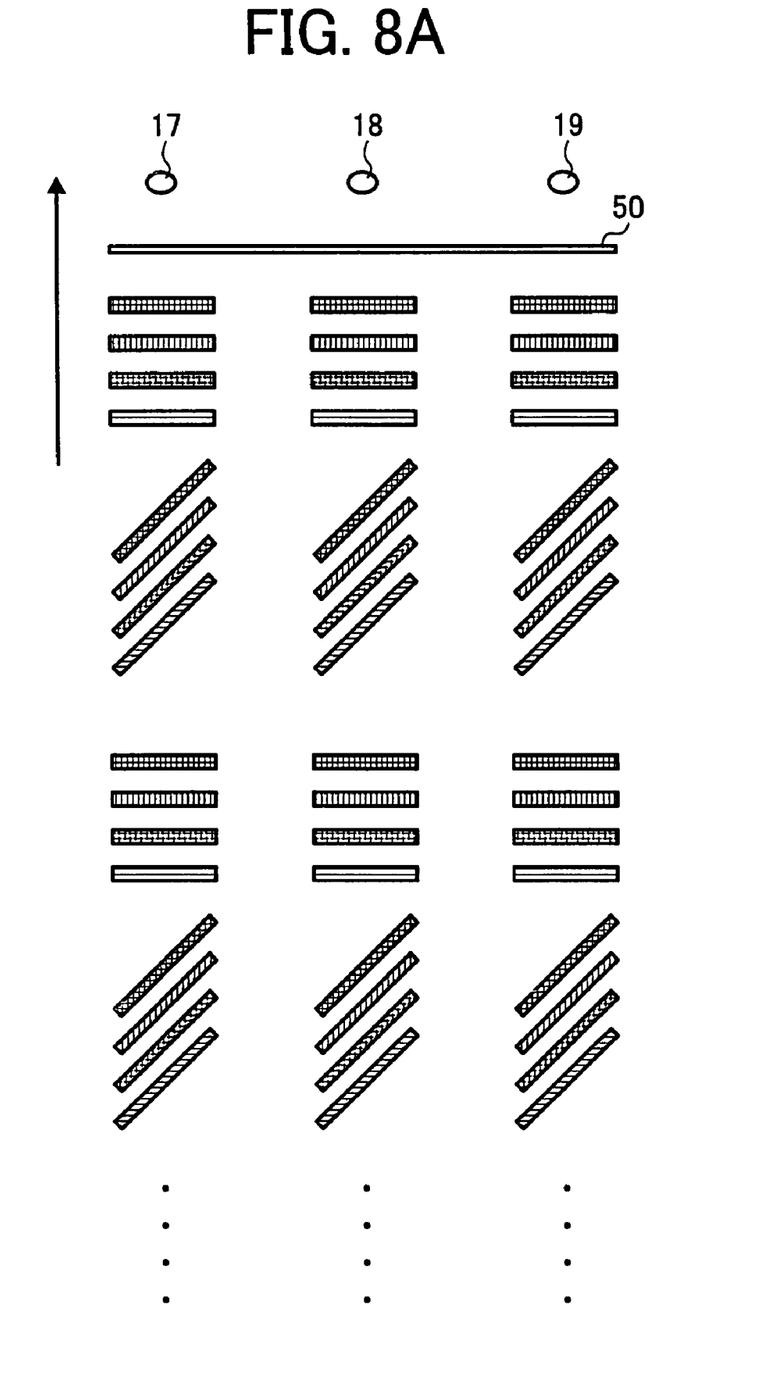
FIG. 8A is a schematic diagram for explaining an example of arrangements of the correction patterns and a second pattern (a type beginning with one line)
Figure 8B:
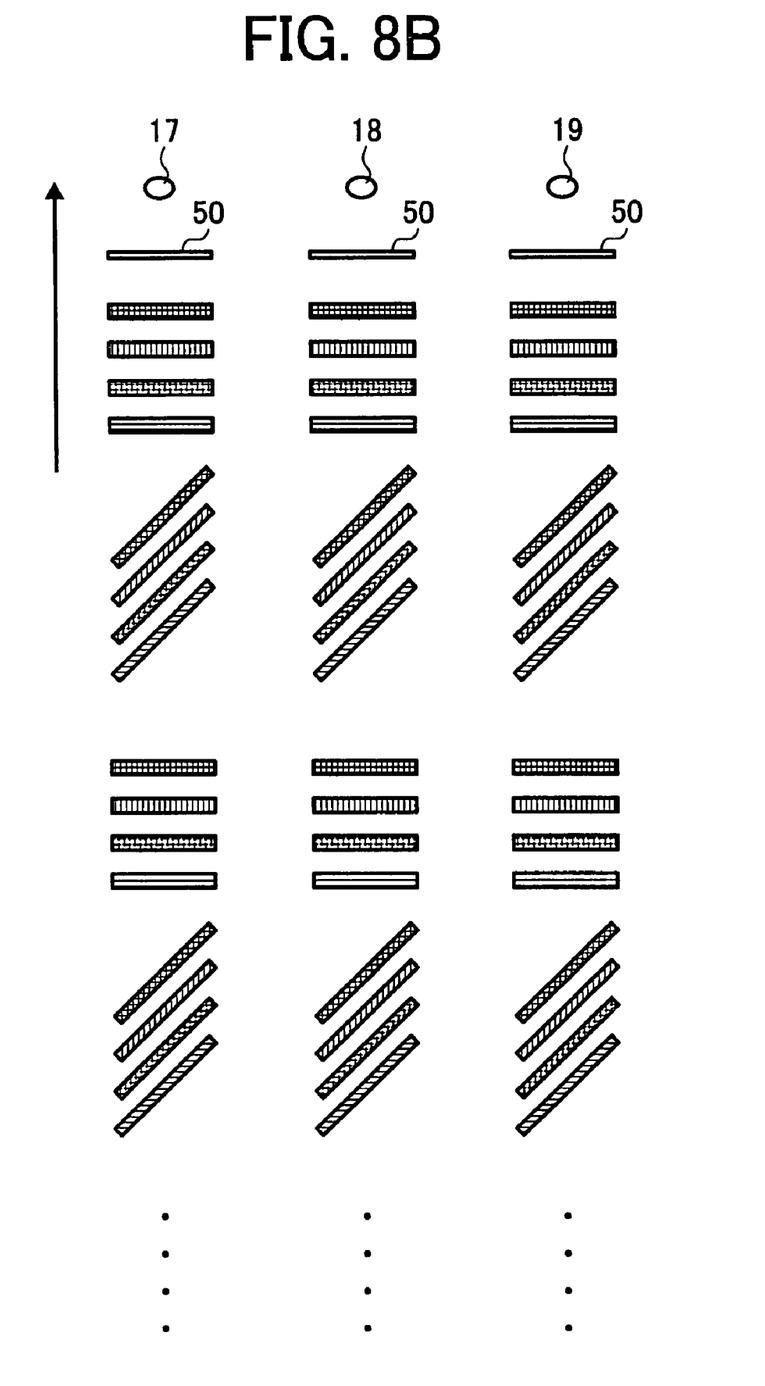
FIG. 8B is a schematic diagram for explaining another example of arrangements of the correction patterns and the second pattern (a type beginning with a line for each set)
Figure 9:
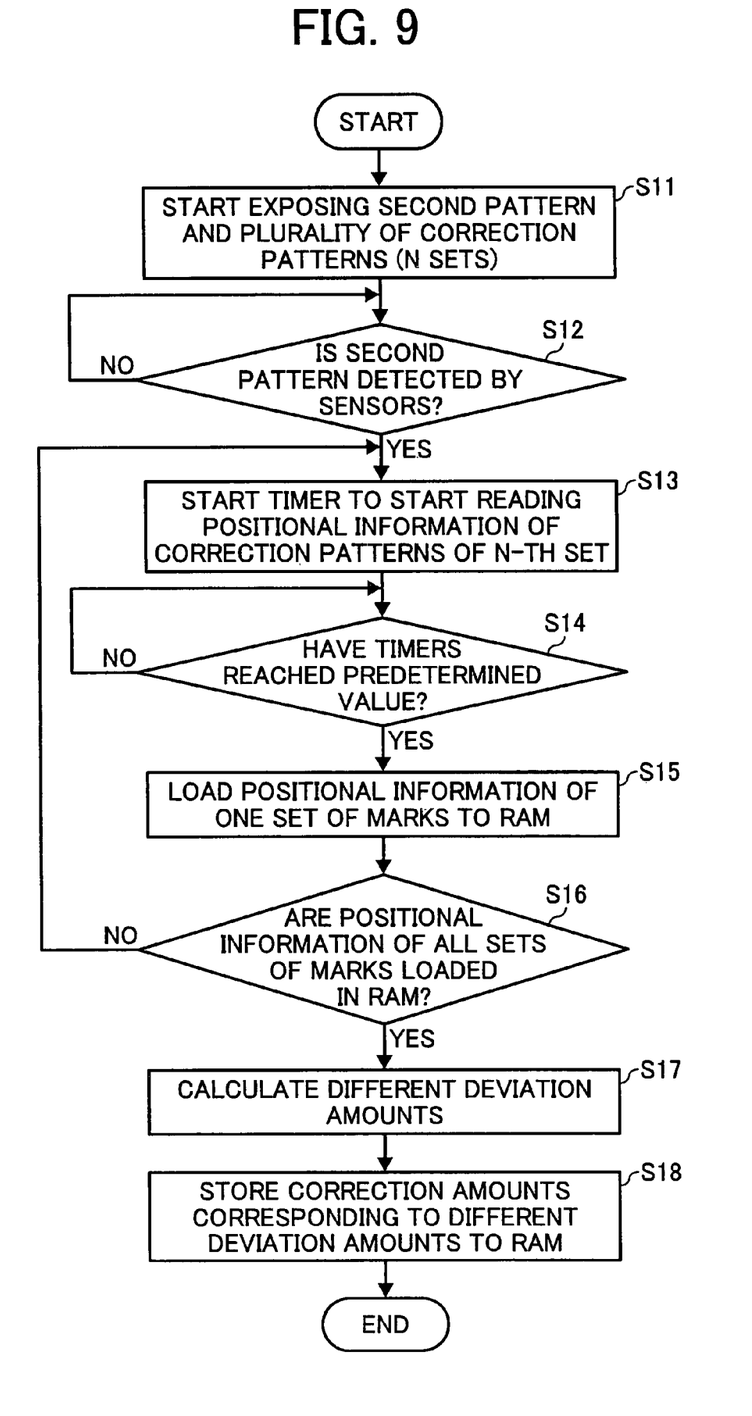
FIG. 9 is a flowchart of a positional deviation controlling operation.

A flowchart of a method of arithmetically controlling a positional deviation correction (first controlling example) is shown in FIG. 9. A process of exposing the second pattern 50 and a plurality (N sets) of the correction patterns 23 is started (step S11). The second pattern 50 is preferably in yellow. FIGS. 8A and 8B are schematic diagrams of the second pattern 50 and N sets of the correction patterns 23. Subsequently, it is decided whether the second pattern 50 is detected by the sensors 17, 18, and 19 (step S12). If the second pattern 50 is detected by the sensors 17, 18, and 19, the system control is given to step S13. At step S13, the timer starts reading positional information of the correction patterns 23 of the N-th set. The timer may have a timer value corresponding to a pattern interval between the second pattern 50 and the correction patterns 23 formed at step S11.

At step S14, it is decided whether the timers have reached a predetermined value. When the timer has reached the predetermined value, the positional information of one set of marks in the RAM 32 is loaded (step S15). Then, it is judge whether the positional information of all the sets of marks are loaded in the RAM (step S16). If the positional information of all the sets of marks are not loaded, the system control is returned to step S13. If the positional information of all the sets of marks are loaded, the system control is goes to step S17.

At step S17, different deviation amounts are calculated based on the loaded positional information. At step S18, the correction amounts corresponding to the deviation amounts are stored in the RAM, and the controlling of the positional deviation correction is completed.

Figure 11:
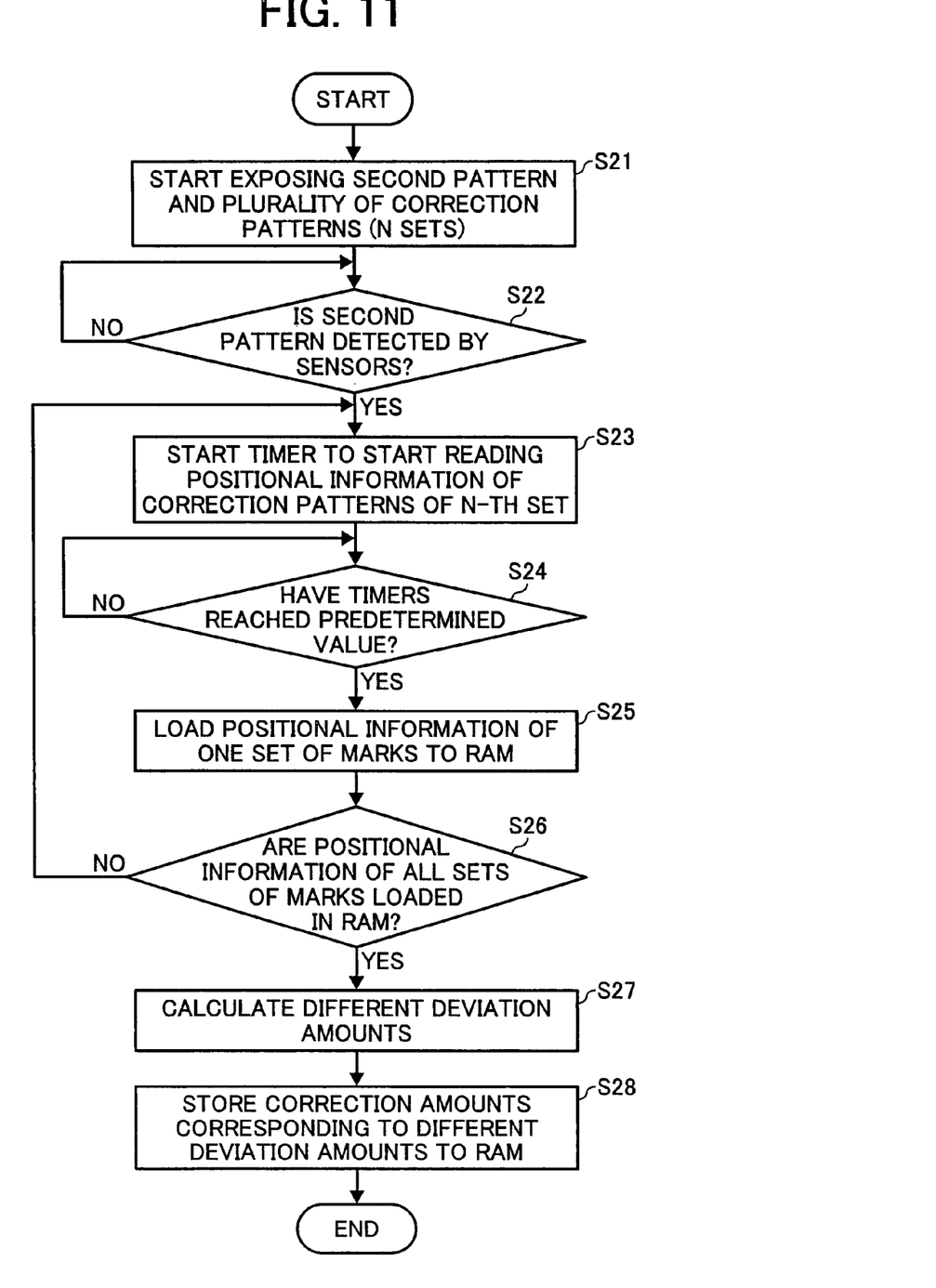
FIG. 11 is a flowchart of a positional deviation controlling operation.

A flowchart of a different method for arithmetically controlling the positional deviation (second controlling example) is shown in FIG. 11. The process shown in FIG. 11 is executed by the controlling unit 40.

Figure 10A:
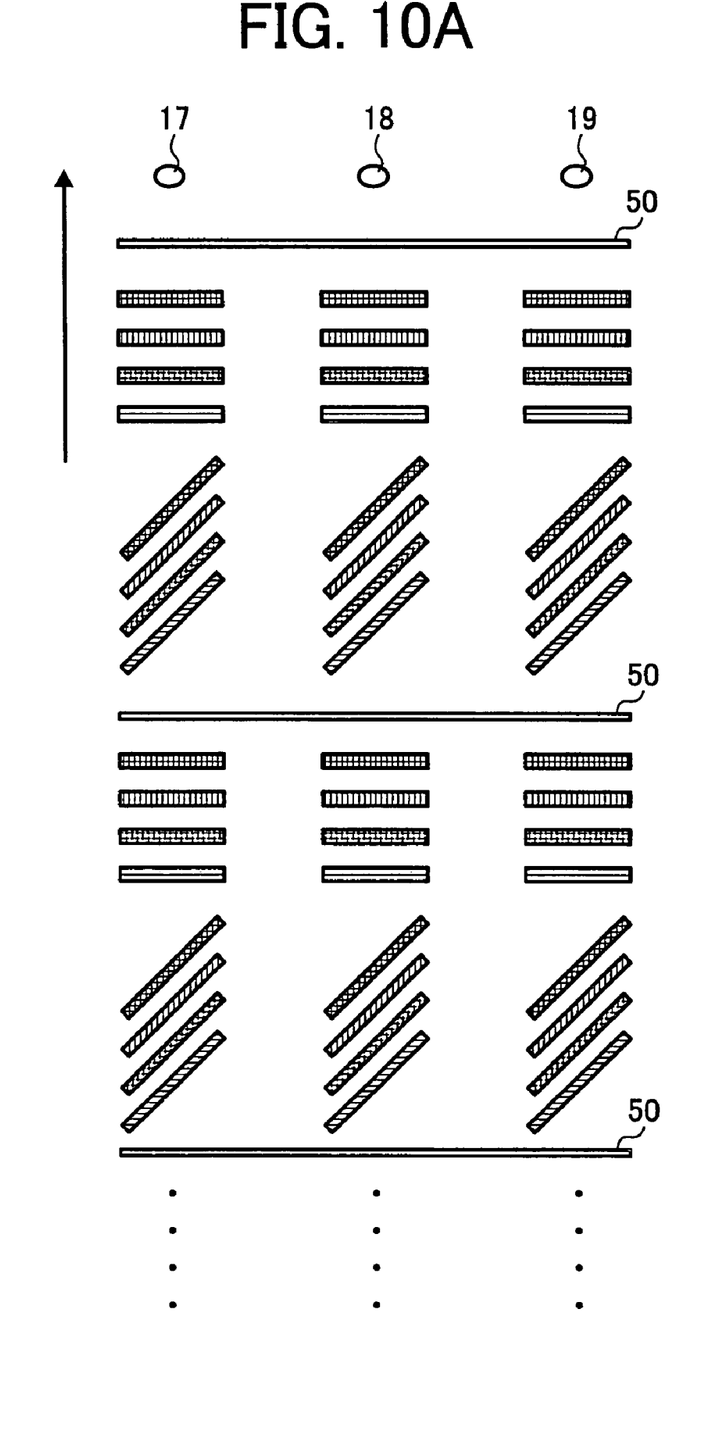
FIG. 10A is a schematic diagram for explaining an example of arrangements of the correction patterns and the second pattern (a type providing one line for each of the sets)
Figure 10B:
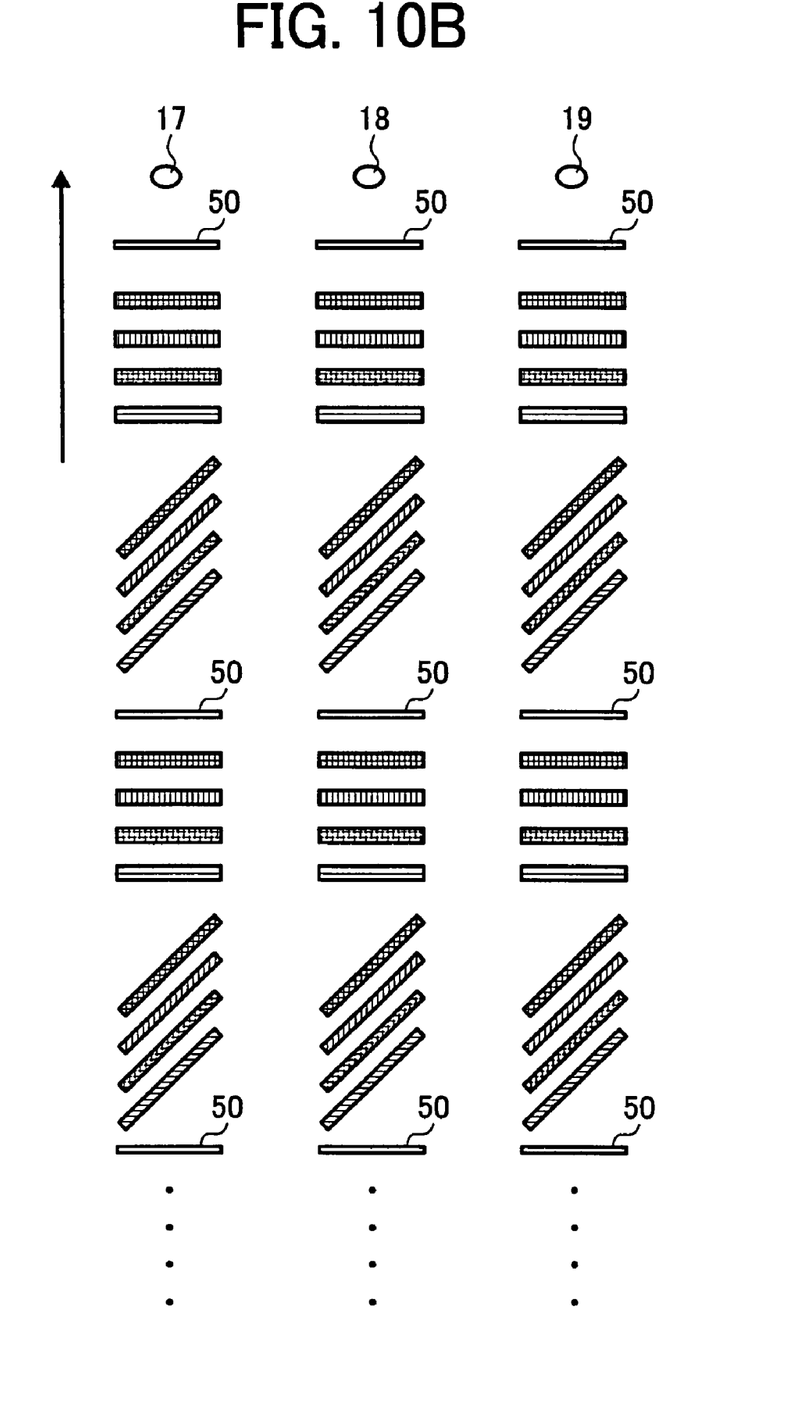
FIG. 10B is a schematic diagram for explaining another example of arrangements of the correction patterns and the second pattern (a type providing lines for each of the sets, respectively)

At step S21, exposing is started of the second pattern 50 and a plurality (N sets) of the correction patterns 23. The second pattern 50 is preferably in yellow. FIGS. 10A and 10B are schematic diagrams of the second pattern 50 and N sets of the correction patterns 23. At step S22, it is decided whether the second pattern 50 is detected by the sensors 17, 18, and 19. If the second pattern 50 is detected by the sensors 17, 18, and 19, the system control goes to step S23. At step S23, the timer starts reading the positional information of the correction patterns 23 of the N-th set. The timer may have the timer value corresponding to the pattern interval between the second pattern 50 and the correction patterns 23 formed at step S21.

At step S24, it is decided whether the timers have reached a predetermined value. If the timers have reached the predetermined value, the positional information of one set of marks is loaded in the RAM 32 (step S25). It is judge whether the positional information of all the sets of marks are loaded in the RAM 32 (step S26). If the positional information of all the sets of marks are not loaded, the system control is returned to step S22. If the positional information of all the sets of marks are loaded, the system control is goes to step S27.

At step S27, different deviation amounts are calculated based on the loaded positional information. At step S28, the correction amounts corresponding to the deviation amounts are stored in the RAM 32, and the controlling of the positional deviation correction is completed.

The respective embodiments are exemplary embodiments of the present invention, and various modifications are possible within the scope and spirit of the present invention. For example, while in the respective embodiments, the configuration of forming the correction patterns to the conveyor belt is described, the endless transporting unit where the image is formed may be an intermediate transfer belt.

While the slit is used as the image detecting unit, as long as the correction patterns 23 can be detected, it is not limited to this configuration, but may be the one without the slit. Also, the detection patterns are aligned vertically and horizontally, but as long as the positional deviation can be detected, it is not limited to this, and the detection patterns may be peak patterns and the like.

In this manner, the second pattern 50, which is different from the correction patterns 23, is formed ahead of the correction patterns 23 in the sub-scanning direction. The timing to start detecting the positional information of each set of the correction patterns 23 is decided, after detecting the positional information of the second pattern 50. This prevents a problem in which the positional information of the correction patterns 23 cannot be detected due to tolerance in the layout size, and the accurate positional correction cannot be performed.

The second pattern 50 is formed before forming the correction patterns 23. The timing to start detecting the positional information of a number of sets of the correction patterns is determined, after detecting the positional information of the second pattern 50. The positional information of the second set of the second pattern 50 is detected, after detecting the final set of the correction patterns. Repeating these can prevent a problem in which the positional information of the correction patterns 23 cannot be detected due to the tolerance in the layout size resulting from environmental fluctuation and the like, and the accurate positional deviation correction cannot be performed.

The second pattern 50 is formed before forming the correction patterns 23. The second pattern 50 is formed in an image forming color furthest from the positional detecting unit. The timing to start detecting the positional information of each set of the correction patterns 23 is determined, after detecting the positional information of the second pattern 50. This prevents a problem in which the positional information of the correction patterns cannot be detected due to the tolerance in the layout size, and the accurate positional deviation correction cannot be performed.

A low-cost apparatus that is capable of detecting the second pattern 50 without fail, and reducing toner consumption required to form the second pattern 50 can be achieved.

According to an aspect of the present invention, it is possible to accurately detect the positional deviation and correct the positional deviation.

According to another aspect of the present invention, the positional-deviation correction apparatus forms the second pattern that is different from the correction patterns, before forming the correction patterns. The timing to start detecting the positional information of a number of set of the correction patterns is determined, after detecting the positional information of the second pattern. The positional information of the second set of the second pattern is detected, after detecting the final set of the patterns. As a result, by repeating these, it offers an advantage of preventing the problem in which the positional information of the correction patterns cannot be detected due to the tolerance in the layout size resulting from the environmental fluctuation and the like, and the accurate positional deviation correction cannot be performed.

According to still another aspect of the present invention, the positional-deviation correction apparatus according to the first or second aspect forms the second pattern that is different from the correction patterns, before forming the correction patterns. The second pattern is formed in the image forming color furthest from the positional detecting unit. The timing to start detecting the positional information of each set of the correction patterns is determined, after the positional information of the second pattern is detected. As a result, it offers an advantage of preventing the problem in which the positional information of the correction patterns cannot be detected due to the tolerance in the layout size, and the accurate positional deviation correction cannot be performed.

According to still another aspect of the present invention, the positional-deviation correction apparatus according to the first or second aspect forms the second pattern in one straight line in the main scanning direction. As a result, it offers an advantage of detecting the second pattern without fail.

According to still another aspect of the present invention, the positional-deviation correction apparatus according to the first or second aspect sets a number of the second pattern corresponding to the number of the positional detecting unit. As a result, it offers an advantage of detecting the second pattern without fail, and reducing toner consumption required to form the second pattern.

According to still another aspect of the present invention, the method of controlling positional deviation forms the second pattern that is different from the correction patterns, before forming the correction patterns. The timing to start detecting the positional information of each set of the correction patterns is determined, after detecting the positional information of the second pattern. As a result, it offers an advantage of solving the problem of the related art in which the positional information of the correction patterns cannot be detected due to the tolerance in the layout size, and the accurate positional deviation correction cannot be performed.

According to still another aspect of the present invention, the method of controlling positional deviation forms the second pattern that is different from the correction patterns, before forming the correction patterns. The timing to start detecting the positional information of a number of set of the correction patterns is determined, after detecting the positional information of the second pattern. The positional information of the second set of the second pattern is detected, after detecting the final set of the patterns. As a result, by repeating these, it offers an advantage of preventing the problem in which the positional information of the correction patterns cannot be detected due to the tolerance in the layout size resulting from environmental fluctuation and the like, and the accurate positional deviation correction cannot be performed.

According to still another aspect of the present invention, the method of controlling positional deviation according to the sixth or seventh aspect forms the second pattern that is different from the correction patterns, before forming the correction patterns. The second pattern is formed in the image forming color furthest from the positional detecting unit. The timing to start detecting the positional information of each set of the correction patterns is determined, after detecting the positional information of the second pattern. As a result, it offers an advantage of preventing the problem in which the positional information of the correction patterns cannot be detected due to the tolerance in the layout size, and the accurate positional deviation correction cannot be performed.

According to still another aspect of the present invention, the method of controlling positional deviation according to the sixth or seventh aspect forms the second pattern in one straight line in the main scanning direction. As a result, it offers an advantage of detecting the second pattern without fail.

According to still another aspect of the present invention, the method of controlling positional deviation according to the sixth or seventh aspect sets the number of the second pattern corresponding to the number of the positional detecting unit. As a result, it offers an advantage of detecting the second pattern without fail, and reducing toner consumption required to form the second pattern.

According to still another aspect of the present invention, the image forming apparatus forms the second pattern that is different from the correction patterns, before forming the correction patterns. The timing to start detecting the positional information of each set of the correction patterns is determined, after detecting the positional information of the second pattern. As a result, it offers an advantage of solving the problem of the related art in which the positional information of the correction patterns cannot be detected due to the tolerance in the layout size, and the accurate positional deviation correction cannot be performed.

According to still another aspect of the present invention, the image forming apparatus forms the second pattern that is different from the correction patterns, before forming the correction patterns. The timing to start detecting the positional information of a number of set of the correction patterns is determined, after detecting the positional information of the second pattern. The positional information of the second set of the second pattern is detected, after detecting the final set of the patterns. As a result, by repeating these, it offers an advantage of preventing the problem in which the positional information of the correction patterns cannot be detected due to the tolerance in the layout size resulting from environmental fluctuation and the like, and the accurate positional deviation correction cannot be performed.

According to still another aspect of the present invention, the image forming apparatus according to the eleventh or twelfth aspect forms the second pattern that is different from the correction patterns, before forming the correction patterns. The second pattern is formed in the image forming color furthest from the positional detecting unit. The timing to start detecting the positional information of each set of the correction patterns is determined, after detecting the positional information of the second pattern. As a result, it offers an advantage of preventing the problem in which the positional information of the correction patterns cannot be detected due to the tolerance in the layout size, and the accurate positional deviation correction cannot be performed.

According to still another aspect of the present invention, the image forming apparatus according to the eleventh or twelfth aspect forms the second pattern in one straight line in the main scanning direction. As a result, it offers an advantage of detecting the second pattern without fail.

According to still another aspect of the present invention, the image forming apparatus according to the eleventh or twelfth aspect sets the number of the second pattern corresponding to the number of the positional detecting unit. As a result, it offers an advantage of detecting the second pattern without fail, and reducing toner consumption required to form the second pattern.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A positional-deviation correction apparatus comprising:
a first-pattern forming unit configured to form a plurality of sets of first correction patterns on an endless conveying unit;
a second-pattern forming unit configured to form a second correction pattern before the first-pattern forming unit forms the first correction patterns;
a detecting unit configured to detect positional information of each set of the first correction patterns and the second correction pattern;
a timer configured to determine a start time for detecting the positional information of the first correction patterns of an N-th set, where the timer has a timer value corresponding to a pattern interval between the second correction pattern and the first correction patterns of the N-th set;
a storage unit configured to load the positional information of the first correction patterns of the N-th set detected by the detecting unit at a storing time that is subsequent to and based on the start time; and
a timing changing unit configured to change a detection timing for detecting the positional information of each set of the first correction patterns from a time point at which the detecting unit detects positional information of the second correction pattern based on the positional information loaded in the storage unit, wherein
the second correction pattern is formed in a color furthest from the detecting unit, and
the timer and storage unit are configured to respectively determine the start time and load the positional information for each set of the first correction patterns before the timing changing unit changes the detection timing.

2. The positional-deviation correction apparatus according to claim 1, wherein the second-pattern forming unit forms one set of the second correction pattern between adjoining first correction patterns.

3. The positional-deviation correction apparatus according to claim 1, wherein the second correction pattern includes one straight line in a main scanning direction.

4. The positional-deviation correction apparatus according to claim 2, wherein the second correction pattern includes one straight line in a main scanning direction.

5. The positional-deviation correction apparatus according to claim 1, wherein the detecting unit is provided in plurality, and one second correction pattern is provided corresponding to each of the detecting unit.

6. A method of controlling positional-deviation comprising:
forming a second correction pattern on an endless conveying unit;
forming a plurality of sets of first correction patterns on the endless conveying unit after the second correction pattern is formed;
detecting positional information of each set of the first correction patterns and the second correction pattern;
starting a timer configured to determine a start time for detecting the positional information of the first correction patterns of an N-th set, where the timer has a timer value corresponding to a pattern interval between the second correction pattern and the first correction patterns of the N-th set;
loading the detected positional information of the first correction patterns of the N-th set to a storage unit at a storing time determined that is subsequent to and based on the start time; and
changing a detection timing, at the detecting, for detecting positional information of each set of the first correction patterns from a time point at which positional information of the second correction pattern is detected at the detecting based on the loaded positional information, wherein the second correction pattern is formed in a color furthest from the detecting, and the starting and loading respectively determine the start time and load the positional information for each set of the first correction patterns before the changing changes the detection timing.

7. The method according to claim 6, wherein the forming includes forming one set of the second correction pattern between adjoining first correction patterns.

8. The method according to claim 6, wherein the second correction pattern includes one straight line in a main scanning direction.

9. The method according to claim 6, wherein the detecting is performed at a plurality of locations, and one second correction pattern is provided corresponding to each of the locations.

10. An image forming apparatus comprising:
a first-pattern forming unit configured to form a plurality of sets of first correction patterns on an endless conveying unit;
a second-pattern forming unit configured to form a second correction pattern before the first-pattern forming unit forms the first correction patterns;
a detecting unit configured to detect positional information of each set of the first correction patterns and the second correction pattern;
a timer configured to determine a start time for detecting the positional information of the first correction patterns of an N-th set, where the timer has a timer value corresponding to a pattern interval between the second correction pattern and the first correction patterns of the N-th set;
a storage unit configured to load the positional information of the first correction patterns of the N-th set detected by the detecting unit at a storing time that is subsequent to and based on the start time; and
a timing changing unit configured to change a detection timing for detecting positional information of each set of the first correction patterns from a time point at which the detecting unit detects positional information of the second correction pattern based on the positional information loaded in the storage unit, wherein
the second correction pattern is formed in a color furthest from the detecting unit, and
the timer and storage unit are configured to respectively determine the start time and load the positional information for each set of the first correction patterns before the timing changing unit changes the detection timing.

11. The image forming apparatus according to claim 10, wherein the second-pattern forming unit forms one set of the second correction pattern between adjoining first correction patterns.

12. The image forming apparatus according to claim 10, wherein the second correction pattern includes one straight line in a main scanning direction.

13. The image forming apparatus according to claim 10, wherein the detecting unit is provided in plurality, and one second correction pattern is provided corresponding to each of the detecting unit.

14. The image forming apparatus according to claim 11, wherein the second correction pattern includes one straight line in a main scanning direction.

15. The image forming apparatus according to claim 11, wherein the detecting unit is provided in plurality, and one second correction pattern is provided corresponding to each of the detecting unit.

* * * * *